(12) United States Patent
Warren et al.

(10) Patent No.: US 10,767,795 B2
(45) Date of Patent: Sep. 8, 2020

(54) FITTING AND METHOD OF MANUFACTURING A FITTING FOR ATTACHING FLEXIBLE TUBE TO RIGID TUBE

(71) Applicant: Anderson Copper and Brass Company LLC, Frankfort, IL (US)

(72) Inventors: David R. Warren, Momence, IL (US); David J. Bonadona, Steger, IL (US); Salem Abuelizam, Schererville, IN (US)

(73) Assignee: Anderson Copper and Brass Company LLC, Frankfort, IL (US)

( * ) Notice: Subject to any disclaimer, the term of this patent is extended or adjusted under 35 U.S.C. 154(b) by 858 days.

(21) Appl. No.: 14/984,566

(22) Filed: Dec. 30, 2015

(65) Prior Publication Data
US 2017/0191592 A1    Jul. 6, 2017

(51) Int. Cl.
F16L 33/30 (2006.01)
F16L 47/02 (2006.01)
F16L 33/207 (2006.01)

(52) U.S. Cl.
CPC ............ *F16L 33/30* (2013.01); *F16L 33/2071* (2013.01); *F16L 47/02* (2013.01)

(58) Field of Classification Search
CPC ............ F16L 33/30; F16L 33/26; F16L 33/34
USPC ............. 285/239, 293.1, 294.3, 296.1
See application file for complete search history.

(56) References Cited

U.S. PATENT DOCUMENTS

| | | | | |
|---|---|---|---|---|
| 1,595,309 A | * | 8/1926 | Mueller | F16L 13/08 |
| | | | | 285/148.12 |
| 4,179,142 A | * | 12/1979 | Schopp | F16L 33/30 |
| | | | | 285/239 |
| 4,712,809 A | * | 12/1987 | Legris | B29C 65/0672 |
| | | | | 156/73.5 |
| 5,078,211 A | * | 1/1992 | Swineford | E21B 43/10 |
| | | | | 116/202 |
| 5,437,481 A | * | 8/1995 | Spears | F16L 47/24 |
| | | | | 285/148.13 |
| 6,186,558 B1 | * | 2/2001 | Komolrochanaporn | |
| | | | | F16L 55/00 |
| | | | | 285/148.19 |
| 6,279,966 B1 | * | 8/2001 | Kondo | F16L 37/0987 |
| | | | | 285/148.19 |

(Continued)

OTHER PUBLICATIONS

Photograph of Fittings for Attaching Flexible Tube to Rigid Tube, publicly available before Dec. 30, 2014.

*Primary Examiner* — Aaron M Dunwoody
(74) *Attorney, Agent, or Firm* — Levenfeld Pearlstein, LLC

(57) ABSTRACT

A fitting for attaching flexible tube to rigid tube comprises a fluid passageway, a tubular metal body, and a polymeric body. The fluid passageway extends through the tubular metal body and the polymeric body is interlocked with the metal body. The polymeric body encircles the fluid passageway and the metal body. A portion of the polymeric body that encircles the metal body forms a male fitting that comprises at least one annular rib or barb and that is configured and adapted to snugly slip into the end of a flexible tube with a press fit. A portion of the polymeric body extends beyond the metal body along the fluid passageway and defines a female socket that is configured and adapted to snugly receive an end of a rigid tube. The socket is configured and adapted to be solvent bondable to polymeric material.

14 Claims, 3 Drawing Sheets

(56) References Cited

U.S. PATENT DOCUMENTS

| | | | | |
|---|---|---|---|---|
| 6,439,620 B1* | 8/2002 | Guest | ............... | F16L 33/18 |
| | | | | 285/239 |
| 7,458,613 B2* | 12/2008 | Spears | ............... | F16L 15/08 |
| | | | | 285/148.11 |
| 7,527,302 B2* | 5/2009 | Lewis | ............... | B21K 1/16 |
| | | | | 285/286.1 |
| 8,172,275 B2* | 5/2012 | Sumrall, Jr. | ............... | B21K 1/16 |
| | | | | 285/286.1 |
| 8,276,947 B2* | 10/2012 | Smahl | ............... | F16L 47/24 |
| | | | | 285/285.1 |
| 2004/0155457 A1* | 8/2004 | Mejlhede | ............... | A61M 39/12 |
| | | | | 285/21.1 |

* cited by examiner

FITTING AND METHOD OF MANUFACTURING A FITTING FOR ATTACHING FLEXIBLE TUBE TO RIGID TUBE

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

The present invention pertains to fittings for attaching relatively flexible tube/plumbing, such PEX tube, to relatively rigid tube/plumbing, such as CPVC or PVC tube. More particularly, the present invention pertains to fitting comprising a tubular metal body encircled by an overmolded polymeric body, wherein the metal body provides rigidity for crimping flexible tube around the polymeric material that encircles the metal body and the polymeric body forms a fitting for solvent bonding a rigid polymeric tube to the fitting.

General Background

As used in the present application, rigid tube/plumbing means tube/plumbing that is typically installed without intentionally deforming the tube/plumbing around turns during installation. Fittings are typically used to route rigid tube around turns. As used in the present application, flexible tube/plumbing means tube/plumbing that typically flexibly deformed around turns during installation.

Rigid tubes formed of polymeric materials such as PVC and CPVC have been used for plumbing for decades and have the advantage of being solvent bondable to fittings from the same polymeric material. An advantage of that as compared to copper or brass tube/plumbing is that solvent bonding does not require or create appreciable heat, whereas soldering/brazing metal tube typically involves an open flame. That advantage is further beneficial in that some procedures involving a risk of fire are prohibited by laws or rules from being performed in buildings while such buildings are open to the public. Another advantage of polymeric tube is that numerous configurations of fittings are available for solvent bonding such tubes to other portions of plumbing. Such fittings are typically relatively inexpensive to produce because they are typically molded in the form of the finished product. Still further, solvent bonding rigid polymeric tubes and fittings can be performed by persons with little training or skill. A disadvantage of rigid polymeric tube is that it does require fitting and joints to take corners.

Flexible tube/pluming, such as PEX tube, has been gaining popularity, primarily because such flexible tube can be bent around corners. This allows a single piece of flexible tube to be routed around corners from one location to almost any other location. This reduces installation time and costs, compared to plumbing installations that require joints and fittings at every turn of pipes path. Like with rigid tube, flexible tube can be attached to other tube via fittings with little skill and without creating a fire risk. However, flexible tube is typically joined to other tubing via male barbed fittings or female compression fittings rather than solvent. When joining flexible tube to a barbed fitting, a compression ring or band clamp is typically crimped or tensioned around the flexible tube and barbed portion of the fitting. To provide sufficient radial stiffness for crimping or tensioning a compression ring or band clamp, the barbed portion of such barbed fittings are typically formed of metal (such as brass or copper).

In some circumstances, it is desirous to operatively attach rigid tube to flexible tube. That can easily be done via a fitting configured specifically for that purpose. Such fitting often comprises a male metal barb fitting that is operatively attached to a female socket fitting formed of solvent bondable polymeric material. Various configurations of such fittings exist.

SUMMARY OF THE INVENTION

The present invention is directed to a fitting configured specifically for joining rigid polymeric tube to flexible tube. The fitting is simple and inexpensive to form and nonetheless provides sufficient rigidity and strength for attaching a flexible tube to the fitting via a compression ring or band clamp.

In one aspect of the invention, a fitting for attaching flexible tube to rigid tube comprises a fluid passageway, a tubular metal body, and a polymeric body. The fluid passageway extends through the tubular metal body and the polymeric body is interlocked with the metal body. The polymeric body encircles the fluid passageway and the metal body. A portion of the polymeric body that encircles the metal body forms a male fitting that comprises at least one annular rib or barb and that is configured and adapted to snugly slip into the end of a flexible tube with a press fit. A portion of the polymeric body extends beyond the metal body along the fluid passageway and defines a female socket that is configured and adapted to snugly receive an end of a rigid tube. The socket is configured and adapted to be solvent bondable to polymeric material.

Another aspect of the invention pertains to a method of forming a fitting for attaching flexible tube to rigid tube. The method comprises overmolding a metal sleeve with a polymeric material. The metal sleeve has an axis of symmetry and the overmolding secures the polymeric material and the metal sleeve to each other. The polymeric material thereafter encircles the metal sleeve and the axis of symmetry and forms a female socket that is spaced from the metal sleeve that is configured and adapted to snugly receive an end of a rigid tube. The polymeric material and the socket are configured and adapted to be solvent bondable to polymeric material. The fitting has a fluid passageway that extends through the female socket and the metal sleeve, to thereby operatively connect a rigid tube to a flexible tube. A portion of the polymeric material that encircles the metal sleeve forms at least one annular rib or barb and is configured and adapted to snugly slip into the end of a flexible tube with press fit.

Further features and advantages of the present invention, as well as the operation of the invention, are described in detail below with reference to the accompanying drawings.

Figure 1:
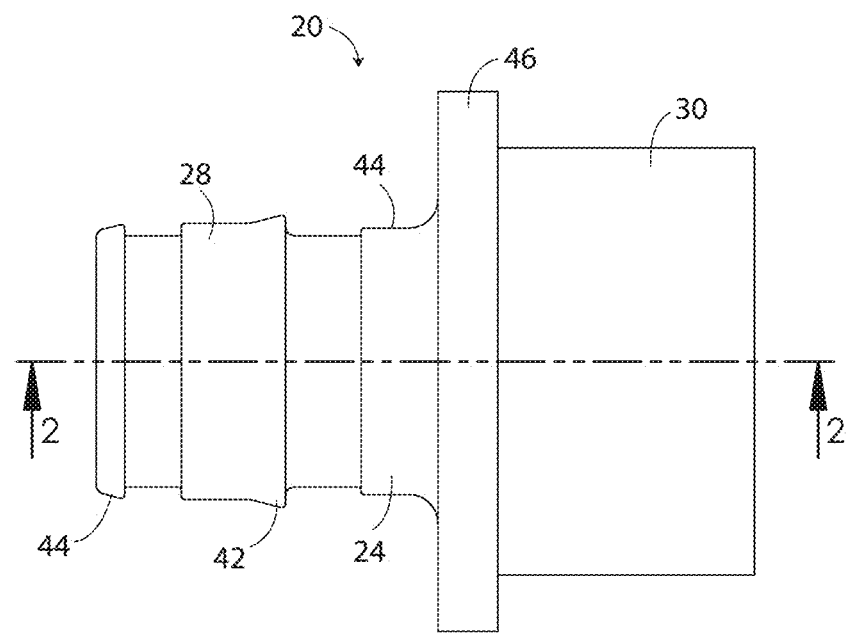
FIG. 1 depicts a side view of an embodiment of a fitting in accordance with the invention.

Reference numerals in the written specification and in the drawing figures indicate corresponding items.

DETAILED DESCRIPTION

A joint fitting (20) in accordance with the invention for joining rigid tube to flexible tube is shown in the drawing figures. The joint fitting (20) comprises a metal body (22) and polymeric body (24). The joint fitting (20) comprises a fluid passageway (26) that extends through the fitting and that is configured to create a fluid connection between the rigid tube and flexible tube attached to the fitting. One end of the joint fitting (20) comprises a barbed or ridged male fitting (28) that is configured to be inserted into an end of flexible tube. The other end of the joint fitting (20) comprises a female socket (30) that is configured to receive an end of rigid tube. The joint fitting (20) as shown is linear. In other words, the female socket (30) and the male fitting (28) are axially aligned. However, it should be appreciated that a joint fitting (20) in accordance with the invention need not be linear and could be, for example, an elbow joint fitting.

The metal body (22) of the joint fitting (20) is preferably a metal sleeve that extends only partially along the length of the joint fitting (20). Preferably the metal sleeve is a shouldered sleeve that comprises a main cylindrical tube portion (32) and an annular flange (34) that extends radially outward relative to the cylindrical tube portion. The annular flange (34) lies at one of the axial ends of the metal body (22) and thereby from one of the axial end faces (36) of the metal body. The inner surface (38) of the metal body and the outer surface (40) of the of the cylindrical tube portion (32) of the metal body (22) preferably are simple cylindrical surfaces. Thus, the metal body (22) has a simple configuration and can be formed fairly easily and at lower cost than traditional tubular metal male barb fittings (which require steps of forming barbs or ridges in the outer surface thereof). The metal body (20) is preferably formed of brass, but could be formed of other metals if desired or needed.

Figure 2:
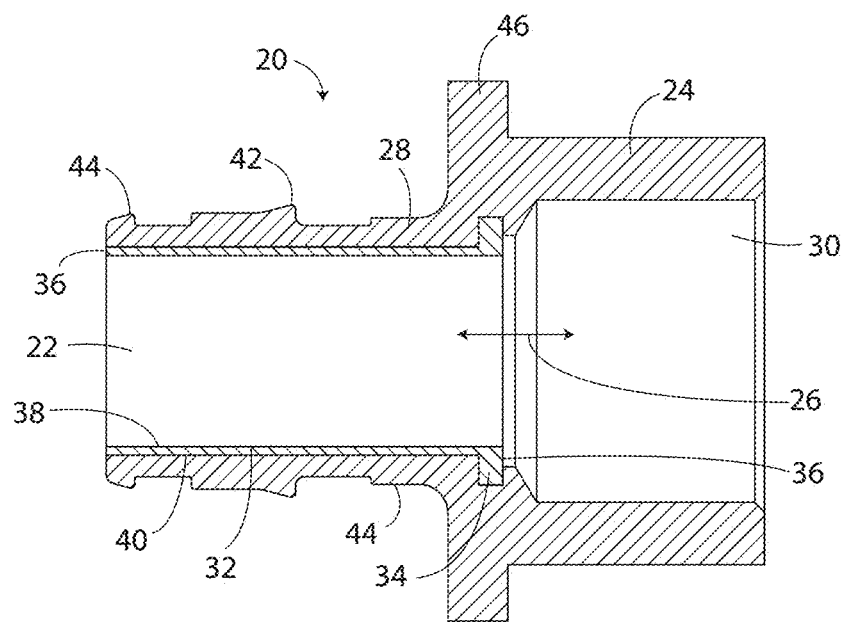
FIG. 2 depicts a cross-section of the fitting shown in FIG. 1, taken about the line 2-2 shown in FIG. 1.
Figure 3:
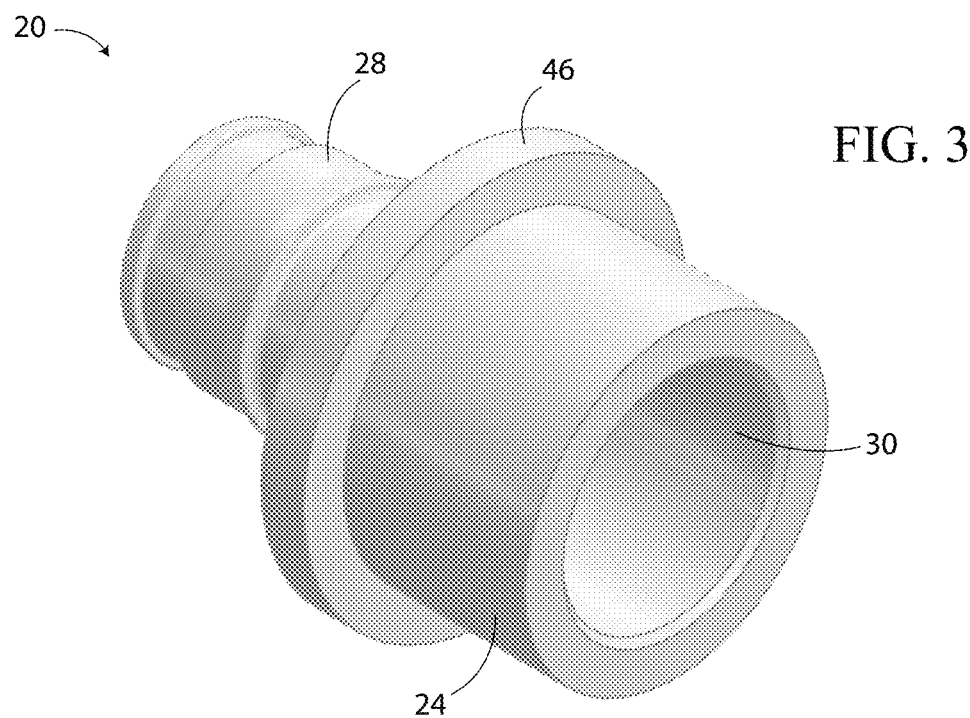
FIG. 3 depicts a perspective view of the fitting shown in FIGS. 1 and 2.
Figure 4:
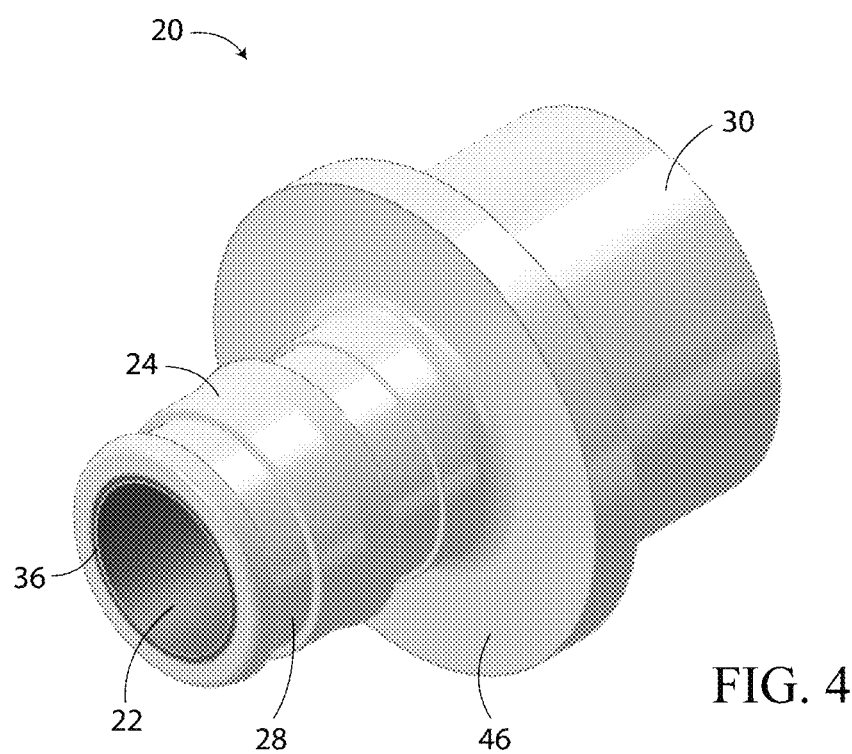
FIG. 4 depicts another perspective view of the fitting shown in FIGS. 1-3.
Figure 5:
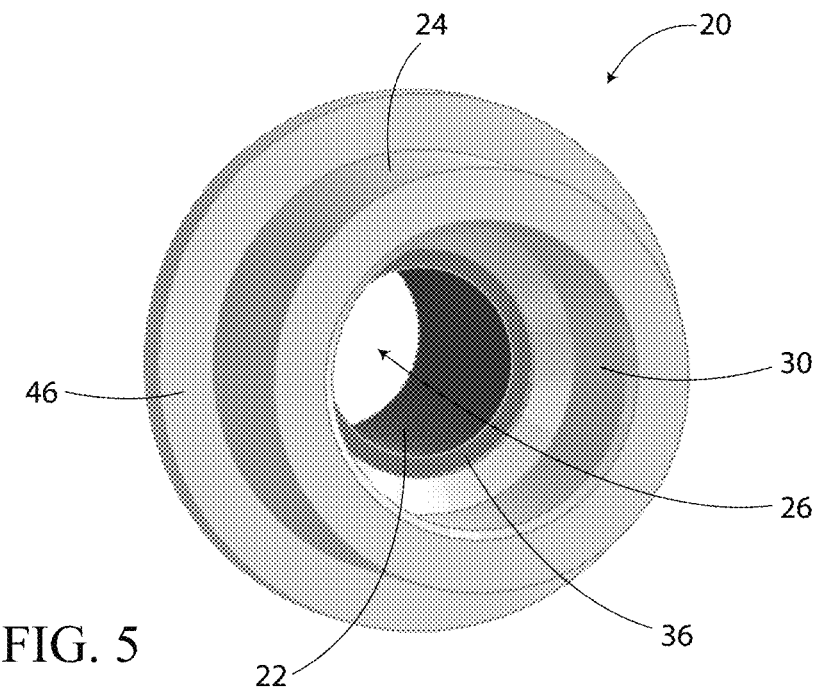
FIG. 5 depicts yet another perspective view of the fitting shown in FIGS. 1-4.
Figure 6:
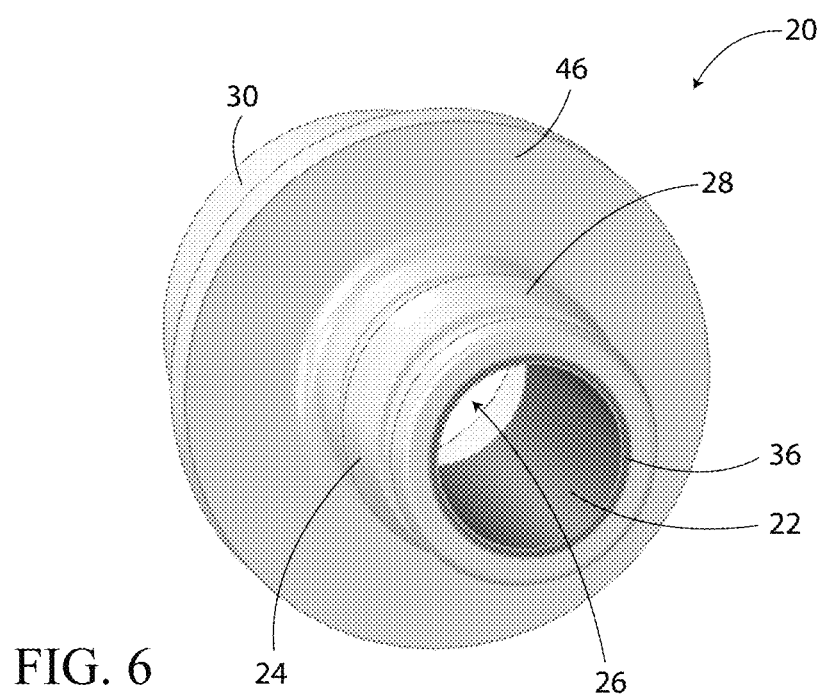
FIG. 6 depicts still yet another perspective view of the fitting shown in FIGS. 1-5.

The polymeric body (24) of the joint fitting (20) is overmolded around the metal body (22) to thereby complete the formation of the fitting. The polymeric material is preferably either PVC or CPVC and is selected to match the polymeric material of the rigid tube intended to be joined by the joint fitting (20). Once solidified, the polymeric body (24) and the metal body (22) are geometrically interlocked to each other (see FIG. 2). The overmolding preferably occurs in a manner such that the axial end face (36) of the metal body (22) opposite the flange (34) of the metal body remains exposed at the end of the male fitting (28) of the joint fitting (20). That simplifies the overmolding process and also serves as a visual indication to customers that the joint fitting (20) is metal-reinforced. A portion of the opposite axial end face (36) of the metal body (22) also remains exposed following the overmolding. This results from the mold used to overmold the metal body (22), which uses the portion of the axial end face (36) at the flange (34) end of the metal body (22) to hold the metal body in the proper axial position during the overmolding process. As can be seen in FIG. 2, some of the axial end face (36) at the flange (34) end of the metal body (22) is covered by polymeric material after the overmolding. Thus, even if the metal body (22) and polymeric body (24) do not adhere or become unadhered to each other, the flange of the metal body will remain trapped by the polymeric body (24) such that the metal body and polymeric body will remain interlocked, both axially and radially (albeit they could then spin relative to each other about the center axis).

The configuration of the polymeric body's (24) other surfaces create the female fitting (30) and the male fitting (28). Notably, the polymeric body (24) extends the full length of the joint fitting (20) and beyond the metal body (22). The portion of the polymeric body (24) that encircles the metal body (22) has an outer surface configuration that forms a barb (42) and a plurality of annular protrusions (44) that protrude radially outward from adjacent surfaces. The portion of the polymeric body (24) that extends beyond the metal body (22) is configured to form a simple cylindrical tube that creates the female socket 30 of the joint fitting (20). Axially between the female socket (30) and the male fitting (28), the polymeric body (24) comprises a annular flange (46) that extend radially outward more than all other portions of the polymeric body (24). The annular flange (46) is helpful when joining tube to the joint fitting (20), as discussed below.

In use, the joint fitting (20) is preferably attached first to the end of rigid tube (not shown) via the female socket (30) of the joint fitting. That involves coating the interior surface of the female socket (30), the exterior surface of the end of the rigid tube, or both with solvent adapted for solvent bonding the particular polymeric material. Shortly thereafter and prior to evaporation of the solvent, the end of the rigid tube is inserted into the female socket (30). Preferably the rigid tube or the joint fitting (20) is pivoted about the longitudinal axis relative to the other component as the end of the tube is axially slid into the female socket (30). The pivoting helps maintain a relatively even distribution of dissolved polymeric material in the interface between the joint fitting (20) and the rigid tube. The flange (46) of the polymeric body (24) of the joint fitting (20) provides a surfaces for gripping and pushing the fitting (20) onto the end of the rigid tube during that process. Once the end of the rigid tube bottoms-out in the female socket (30), the component can be released and, after some time passes, the solvent will evaporate, which resolidifies the previously dissolved polymeric material and thereby bonds and seals the joint fitting (20) to the end of the rigid tube.

The joint fitting (20) is preferably attached to the end of a flexible tube (not shown) after the joint fitting has been attached to a rigid tube. To do this, the end of the flexible tube is forced around and over the male fitting (28) of the joint fitting (22) by axially forcing the flexible tube against the joint fitting. At least the barb (42) of the male fitting (28) has a largest diameter that is slightly greater than the internal diameter of the flexible tube such that the flexible tube becomes resiliently deformed radially at the location of the barb. This ensures that there is uninterrupted annular contact between the male fitting (28) and the internal surface of the end of the flexible tube. After that flexible tube bottoms-out over the male fitting (28), a crimp ring or a band clamp is preferably then secured around the end of the flexible tube to apply even greater radial force between the male fitting and the flexible tube (the crimp ring or band clamp is preferably slid onto the flexible tube prior to forcing the flexible tube onto the male fitting). The radial force creates an annular seal between the joint fitting (20) and the flexible tube. The metal body (22) of the joint fitting (20) radially stiffens the male fitting (28) and thereby ensures that a sufficient radial force can be obtained.

An advantage of joint fittings configured in accordance with the invention is that the polymeric body portion forms both the male fitting and the female fitting of the joint fitting (20) and therefore there are no seals of the joint fitting itself to fail. Another advantage is that by forming the male fitting of polymeric material rather than metal, the male fitting will not corrode (which could otherwise cause leakage). Yet another advantage is that the simplicity of the configuration of the joint fitting (e.g., simplistic metal body, lack of any seal members between metal and polymeric portions of the joint fitting, and simple method of forming the fitting) allows the joint fitting to be formed relatively inexpensively. Other advantages should be apparent.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A fitting for attaching flexible tube to rigid tube, the fitting comprising:
    a fluid passageway;
    a tubular metal body, the fluid passageway extending through the tubular metal body; and
    a polymeric body interlocked with the metal body, the polymeric body encircling the fluid passageway and the metal body, a portion of the polymeric body that encircles the metal body forming a male fitting, the male fitting comprising at least one annular rib or barb and being configured and adapted to snugly slip into the end of a flexible tube with a press fit, a portion of the polymeric body extending beyond the metal body along the fluid passageway and defining a female socket configured and adapted to snugly receive an end of a rigid tube in a manner such that the female socket is in direct contact with the pipe when the pipe is inserted in fitting, the socket being configured and adapted to be solvent bondable to the pipe.

2. A fitting in accordance with claim 1 wherein the fluid passageway is linear and the male fitting is aligned with the female socket.

3. A fitting in accordance with claim 2 wherein the fitting has a uniform cross-section revolved about an axis.

4. A fitting in accordance with claim 1 wherein the metal body has an internal surface that is exposed to the fluid passageway.

5. A fitting in accordance with claim 1 wherein the metal body is a sleeve spacer having an annular flange, the sleeve spacer defines an axis of symmetry of the metal body, and the flange is flanked on axially opposite sides by the polymeric material in a manner interlocking the polymeric body to the metal body.

6. A fitting in accordance with claim 5 wherein the sleeve spacer has axially opposite end faces and at least a portion of each of the axial end faces of the sleeve is exposed.

7. A fitting in accordance with claim 1 wherein the metal body has an inner surface, an outer surface, and opposite end surfaces, and the outer surface of the metal body is completely enshrouded by the polymeric body.

8. A fitting in accordance with claim 1 wherein the fitting is configured and adapted to attach a flexible tube having an inner diameter to a rigid tube having the same inner diameter.

9. A fitting in accordance with claim 1 wherein the metal body is formed of brass and the polymeric body is formed of chlorinated polyvinyl chloride.

10. A method of forming a fitting for attaching flexible tube to rigid tube, the method comprising:
    overmolding a metal sleeve with a polymeric material, the metal sleeve having an axis of symmetry, the overmolding securing the polymeric material and the metal sleeve to each other, the polymeric material thereafter encircling the metal sleeve and the axis of symmetry and forming a female socket spaced from the metal sleeve that is configured and adapted to snugly receive an end of a rigid tube in a manner such that the female socket is in direct contact with the rigid tube, the polymeric material and the socket being configured and adapted to be solvent bondable to the rigid tube, the fitting having a fluid passageway that extends through the female socket and the metal sleeve, a portion of the polymeric material that encircles the metal sleeve forming at least one annular rib or barb and being configured and adapted to snugly slip into the end of a flexible tube with press fit.

11. A method of forming a fitting in accordance with claim 10 wherein the overmolding occurs in a manner such that the female socket is axially aligned with the metal sleeve and the axis of symmetry.

12. A method of forming a fitting in accordance with claim 11 wherein the overmolding occurs in a manner such that the fitting has a uniform cross-section revolved about the axis of symmetry.

13. A method of forming a fitting in accordance with claim 10 wherein the metal sleeve comprises an annular flange, and the overmolding occurs in a manner such that the flange is flanked on axially opposite sides by the polymeric material in manner interlocking the polymeric material to the metal sleeve.

14. A method of forming a fitting in accordance with claim 13 wherein the metal sleeve has axially opposite end faces, and the overmolding occurs in a manner such that at least a portion of each of the axial end faces of the sleeve is exposed.

* * * * *